United States Patent [19]

Bagby et al.

[11] 3,977,623

[45] Aug. 31, 1976

[54] FILM DRIVE MODE CHANGE ACTUATOR

[75] Inventors: John P. Bagby, Lake Forest, Ill.; Leonard A. Ferrari, San Clemente, Calif.; Erwin E. Figge, Des Plaines; Kenyon A. Hapke, Libertyville, both of Ill.

[73] Assignee: Polaroid Corporation, Cambridge, Mass.

[22] Filed: Jan. 21, 1975

[21] Appl. No.: 542,782

Related U.S. Application Data

[63] Continuation of Ser. No. 374,286, June 28, 1973, abandoned.

[52] U.S. Cl. .......... 242/191; 242/205; 352/130

[51] Int. Cl.² .......... B65H 59/38; G03B 1/02; G11B 15/13

[58] Field of Search .......... 242/189–191, 242/205; 352/130; 350/130; 354/78

[56] References Cited

UNITED STATES PATENTS

| | | | |
|---|---|---|---|
| 3,642,226 | 2/1972 | Tokunaga | 242/191 |
| 3,771,861 | 11/1973 | Land | 354/78 |
| 3,800,306 | 3/1974 | Land | 352/130 |

*Primary Examiner*—Leonard D. Christian

[57] ABSTRACT

A system for initiating operating mode change in a film handling apparatus in response to cessation of film movement incident to an end-of-film condition.

10 Claims, 4 Drawing Figures

12VDC
9VDC
D10
D21
Q1
Q2
R1
R2
R3
R4
R5
R6
R8
R10
C1
C2
40a/40b
N S

FILM DRIVE MODE CHANGE ACTUATOR

This is a continuation of the co-pending U.S. application, Ser. No. 374,286 filed on June 28, 1973 by John P. Bagby, et al. entitled "MODE CHANGE ACUTATOR" and now abandoned.

This invention relates to web handling apparatus and, in particular, to a system for initiating mode change in response to cessation of web movement incident to an end-of-web condition.

In web handling apparatus such as motion picture film processors and projectors having plural operating modes, it may be desirable from the standpoint of convenience or improved operation or both to relieve the operator of the need to manually initiate the next operating mode of the apparatus when the current operating mode is completed. In motion picture projectors, for example, film tension sensing devices have been used to automatically initiate a film rewind mode in response to an increase in film tension when the end of the film is reached during the projection mode. However, a film tension sensing system may impose an undesired drag on the film or otherwise interfere with film handling. Moreover, a film tension sensing system may be difficult to employ in some devices. For example, in the case of a motion picture projector or similar film handling device which is designed to handle film maintained on supply and take-up reels both contained on a single detachable cassette, it may not be possible to obtain sufficient access to the film during operation to reliably sense its tension.

Accordingly, it is a principal object of the present invention to provide an improved system for initiating mode change in a web handling apparatus which is versatile in application and which presents minimum of interference with web handling.

It is a specific object of the present invention to provide a system for initiating operating mode change in a web handling apparatus incident to an end-of-web condition which includes means for modulating a magnetic field in response to rotation of a web handling reel to produce a pulsating voltage signal and means responsive to cessation of the pulsating voltage signal to produce an output signal for actuating a mode change control unit.

These and other objects and features of the present invention will be better understood by reference to the following detailed description taken in conjunction with the accompanying drawings.

Figures 1, 2, 3, 4:
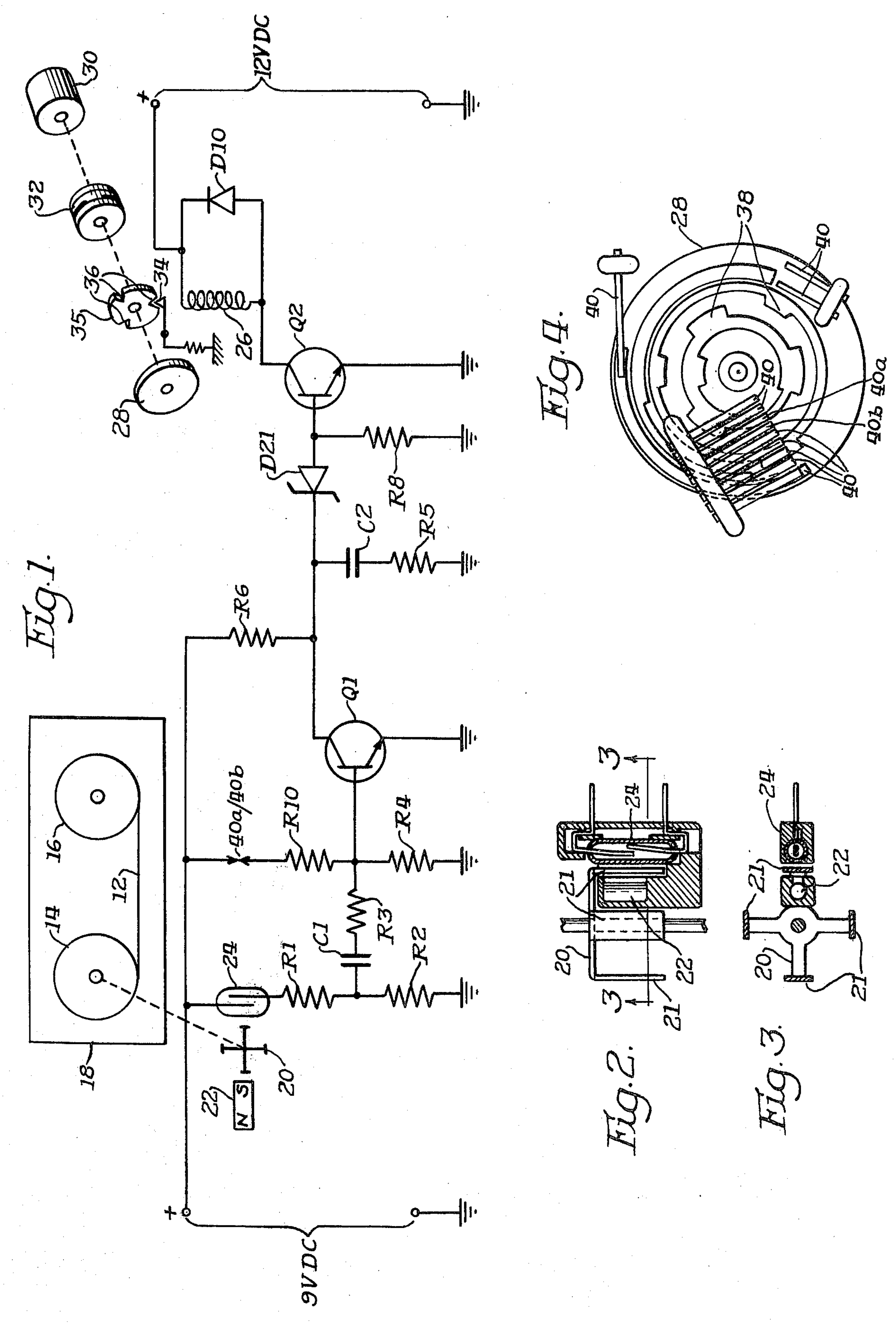
FIG. 1 is a diagrammatic illustration of a mode change actuator system in accordance with the present invention.
FIG. 2 is a top view of the transducer assembly used in the mode change actuator system of FIG. 1.
FIG. 3 is a cross-sectional view taken at 3—3 of FIG. 2.
FIG. 4 is a front view of the mode change logic disc used in the mode change actuator system of FIG. 1.

Referring now to the drawings, a preferred embodiment of the mode change actuator system is shown in FIG. 1 in a form suitable for use in a processor/projector unit designed to handle film maintained on supply and take-up reels contained in a cassette. A description of a control system for such a processor/projector unit which incorporates a mode change actuator system in accordance with the present invention is set forth in co-pending application of Erwin E. Figge et al U.S. Ser. No. 374,284 filed on June 28, 1973, entitled FILM HANDLING APPARATUS CONTROL SYSTEM, filed concurrently herewith, and assigned to the same assignee now U.S. Pat. No. 3,941,465. It should be understood, however, that the mode change actuator of this invention may be advantageously employed in other web handling devices which have plural operating modes.

In FIG. 1, the film 12 is maintained on reels 14 and 16 contained within a cassette 18. The film 12 is secured at one end to the hub of reel 14 and secured at its opposite end to the hub of reel 16.

The mode change actuator system of FIG. 1 includes a transducer assembly which is responsive to cessation of rotation of one of the film reels 14 as indicative of an end-of-film condition. More specifically, a four-bladed wheel 20 is coupled by suitable means (not shown) to rotate with the film reel 14. As best illustrated in FIGS. 2 and 3, the bladed wheel 20 is provided with four radially-spaced axially-extending blades 21 of ferromagnetic material and functions to modulate the magnetic field of a magnet 22 by repeatedly interrupting the magnetic flux path to a reed switch 24. The normally-open reed switch 24 is magnetically-responsive and is closed by the influence of the magnetic field of the magnet 22. However, when one of the blades 21 of the wheel 20 enters the region between the magnet 22 and the reed switch 24, it effectively shunts the magnetic flux which would otherwise reach the reed switch 24 and thereby permits the reed switch to open. Accordingly, as the bladed wheel 20 rotates with the reel 14, the reed switch 24 repeatedly opens and closes at an effective rate of four closures per revolution of the reel 14.

The control portion of the mode change actuator circuit of FIG. 1 is powered by a 9 volt DC supply voltage. As seen, the reed switch 24 is connected in series with resistors R1 and R2 across the 9 volt supply voltage. Hence, as the reel 14 rotates, the reed switch 24 produces a pulsating DC voltage signal at the junction of resistors R1 and R2. This pulsating voltage signal is passed by the RC coupling network comprising capacitor C1 and resistor R3 and applied across the resistor R4 and the base-emitter junction of the NPN transistor Q1.

The pulsating voltage signal drives a capacitor discharge circuit to maintain a control capacitor C2 effectively discharged. More specifically, the pulsating voltage signal appearing at the junction of resistors R3 and R4 repeatedly forward biases the base-emitter junction of the transistor Q1 to repeatedly render the transistor Q1 conductive. The collector-emitter circuit of the transistor Q1 is connected across the series RC network consisting of control capacitor C2 and resistor R5. The control capacitor C2 is connected to the 9 volt DC supply voltage through a charging resistor R6 and would normally tend to charge. However, so long as the transistor Q1 is repeatedly rendered conductive, current flow through its collector-emitter circuit effectively overcomes the charging circuit to maintain the control capacitor C2 discharged to a very low voltage level.

The base of an NPN grounded-emitter output transistor Q2 is connected to the junction of the resistor R6 and the control capacitor C2 through a zener diode D21. So long as the control capacitor C2 is maintained discharged, the output transistor Q2 remains non-conductive. However, if the control capacitor is permitted to charge to a voltage level sufficient to break down the zener diode D21 a positive voltage is developed across the resistor R8 causing the base-emitter junction of the transistor Q2 to become forward biased thereby rendering the transistor Q2 conductive to draw collector current from a 12 volt DC voltage supply through a magnet coil 26.

The magnet coil 26 forms part of a mode change logic and reset unit which further comprises a logic disc 28 which is rotatably driven by motor 30 acting through a slip clutch 32. The logic disc 28 is secured to a suitable rotational position control mechanism represented diagrammatically as a detent wheel 35 moving a plurality of detents 36 and cooperating with a pawl 34 which is spring biased toward the detent wheel 35 for the purpose of normally restraining the detent wheel 35 and logic disc 28 against rotation by engagement with one of the detents 36. The pawl 34 is positioned and adapted to respond to the magnetic field of the coil 26. When the coil 26 is energized, the pawl 34 is retracted from detent engagement with the wheel 35 to permit rotation of the logic disc 28. As illustrated in FIG. 4, the face of the logic disc 28 is provided with conductive portions 38. A plurality of contact elements 40 are positioned to bear against the face of the disc 28. The conductive portions 38 are configured and the contact elements 40 positioned such that electrical continuity may be established between particular contact elements depending upon the rotational position of the disc 28. In this manner, the disc 28 may be used as a logic device to change the operational mode of the film handling apparatus when the disc 28 is permitted to rotate from one detent position to the next. Moreover, two of the contact elements **40*a* and 40*b* provide a reset switch designated 40*a*/40*b* in FIG. 1. As further described hereinafter, the logic disc 28 effects a momentary continuity between element 40*a* and 40*b* whenever the logic disc is permitted to rotate from one detent position to the next to effect a momentary closure of the reset switch 40*a*/40*b* in FIG. 1. Momentary closure of the switch 40*a*/40*b* resets the mode change actuator circuit by completing a momentary connection of the base of transistor Q1 to the 9 volt DC supply through resistor R10 thereby momentarily biasing the transistor Q1 into conduction to discharge the control capacitor C2 causing transistor Q2 to become non-conductive. The magnet coil 26** through diode D10 is thereby de-energized to reset the mode change actuator circuit for the next operational mode of the apparatus. A particular application of this form of mode change logic unit is described in the aforesaid application of Erwin E. Figge et al U.S. Ser. No. 374,284 filed on June 28, 1973, entitled FILM HANDLING APPARATUS CONTROL SYSTEM now U.S. Pat. No. 3,941,465.

Turning now to a consideration of operation of the mode change actuator system, it should be noted at the outset that regardless of the direction of rotation of the reel 14, the bladed wheel 20 will produce a pulsating voltage signal so long as the reel 14 continues to rotate. The resultant differentiated signal at the base of Q1 will accordingly effect the flow of sufficient collector current through the transistor Q1 to maintain the charge on control capacitor C2 below the level required to break down the zener diode D21 to turn on the output transistor Q2.

Upon a cessation of rotation of the reel 14 incident to an end-of-film condition, stoppage of the bladed wheel 20 terminates the production of the pulsating voltage signal by the reed switch 24 and no signal is passed by the capacitor C1 to the base of the control transistor Q1. Accordingly, the transistor Q1 turns off permitting the control capacitor C2 to charge via resistors R5 and R6 to a voltage level (approximately 7 volts) sufficient to break down the zener diode D21. This turns on the output transistor Q2, energizing the magnet coil 26 to retract the pawl 34. The logic disc 28 is thereby released to begin rotation toward its next detent position to actuate the film handling apparatus for the next operational mode. During the period of rotation to the next detent position, the logic disc 28 momentarily establishes an electrical continuity between the contact elements **40*a* and 40*b* to effect a momentary closure of the reset switch 40*a*/40*b*. Closure of the switch 40*a*/40*b* turns on the transistor Q1 to discharge the control capacitor C2 even through the reel 14 may not have yet begun to rotate pursuant to the next operational mode of the film handling apparatus. The time duration of the switch 40*a*/40*b* closure and the RC discharge time constant for the control capacitor C2 should be sufficiently large to prevent the control capacitor C2 from charging to the zener diode D21 breakdown level before the reel 14 again begins rotating. Once the reel 14 begins rotating, the control capacitor will be kept sufficiently discharged by the system in that manner described above. The momentary closure of the switch 40*a*/40*b* thus serves to reset the mode change actuator system to cause a de-energization of the magnet coil 26 to permit the pawl 34 to engage and stop the logic disc 28** when it reaches its next detent position.

What is claimed is:

1. A system for initiating operating mode change in a web handling apparatus which includes a rotatable, web handling reel, said system comprising:

energy storage means;

charging means for charging said energy storage means;

output circuit means for producing an output signal for initiating a mode change by the web handling apparatus when said energy storage means is charged above a predetermined level;

transducer means responsive to rotation of the web handling reel for producing a pulsating signal; and discharge control means for overcoming said charging means to maintain said energy storage means discharged to a level below said predetermined level in response to the presence of said pulsating signal, whereby said energy storage means is charged to a level above said predetermined level to cause the production of said output signal when said pulsating signal terminates in response to cessation of rotation of the web handling reel.

2. The invention defined in claim 1 wherein said energy storage means comprises a capacitor.

3. The invention defined in claim 1 wherein said transducer means comprises:

means for modulating a magnetic field in response to rotation of the web handling reel; and means responsive to modulations of said magnetic field to produce said pulsating signal.

4. The invention defined in claim 1 wherein said transducer means comprises:

magnet means for producing a magnetic field;

a normally open switch means positioned in said magnetic field and responsive to the influence thereof to close; and a rotatable means for rotating with the web handling reel, said rotatable means including a plurality of ferro-magnetic projections which pass sequentially between said magnet means and said switch means during rotation of said rotatable means to repeatedly interrupt the magnetic flux path between said magnet means and said switch means thereby causing said switch means to repeatedly open and close during rotation of said web handling reel.

5. A system for initiating operating mode change in a film handling apparatus which includes a rotatable, film handling reel, said system comprising:

energy storage means;

charging means for charging said energy storage means;

output circuit means for producing an output signal when said energy storage means is charged above a predetermined level;

transducer means responsive to rotation of the film handling reel for producing a pulsating signal;

discharge control means for receiving said voltage and overcoming said charging means to maintain said energy storage means discharged to a level below said predetermined level in response to the continuing presence of said pulsating signal whereby said energy storage means is charged to level above said predetermined level to cause the production of said output signal when said pulsating signal ceases in response to cessation of rotation of the film handling reel; and mode change actuator and reset means responsive to said output signal for actuating an operating mode change by the film handling apparatus and for momentarily causing said discharge control means to effect a discharge of said energy storage means to a low level below said predetermined level to thereby reset said system.

6. The invention defined in claim 5 wherein said energy storage means comprises a capacitor.

7. The invention defined in claim 5 wherein said transducer means comprises:

means for modulating a magnetic field in response to rotation of the film handling reel; and means responsive to modulations of said magnetic field to produce said pulsating signal.

8. The invention defined in claim 5 wherein said transducer means comprises:

magnet means for producing a magnetic field;

a normally open switch means positioned in said magnetic field and responsive to the influence thereof to close; and a rotatable means for rotating with the film handling reel, said rotatable means including a plurality of ferro-magnetic projections which pass sequentially between said magnet means and said switch means during rotation of said rotatable means to repeatedly interrupt the magnetic flux path between said magnet means and said switch means thereby causing said switch means to repeatedly open and close during rotation of said web handling reel.

9. A system for initiating operating mode change in a web handling apparatus which includes a rotatable, web handling reel, said system comprising:

a control capacitor;

charging means for charging said control capacitor;

output circuit means for producing an output signal when said control capacitor is charged above a predetermined level;

means for producing a magnetic field;

means for modulating said magnetic field in response to rotation of the web handling reel;

means responsive to modulations of said magnetic field to produce a pulsating signal;

discharge control means for overcoming said charging means to maintain said control capacitor discharged to a level below said predetermined level in response to the presence of said pulsating signal, whereby said control capacitor is charged to a level to cause production of said output signal when said pulsating signal terminates in response to cessation of rotation of the web handling reel; and mode change actuator and reset means responsive to said output signal for actuating an operating mode change by the web handling apparatus and for momentarily causing said discharge control means to effect a discharge of said control capacitor to a low level below said predetermined level to thereby reset said system.

10. A system for initiating operating mode change in a film handling apparatus which includes a rotatable, film handling reel, said system comprising:

a control capacitor;

charging means for charging said control capacitor;

output circuit means for producing an output signal when said control capacitor is charged above a predetermined level;

magnet means for producing a magnetic field;

a normally open reed switch positioned in said magnetic field and responsive to the influence thereof to close;

a rotatable means for rotating with the film handling reel, said rotatable means including a plurality of radially-spaced axially-extending ferro-magnetic projections which pass sequentially between said magnet means and said switch means during rotation of said rotatable means to repeatedly interrupt the magnetic flux path between said magnet means and said reed switch thereby causing said reed switch to repeatedly open and close during rotation of said film handling reel to produce a pulsating signal;

discharge control means for overcoming said charging means to maintain said control capacitor discharged to a level below said predetermined level in response to the presence of said pulsating signal, whereby said control capacitor is charged to a level to cause production of said output signal when said pulsating signal terminates in response to cessation of rotation of the film handling reel; and mode change actuator and reset means responsive to said output signal for actuating an operating mode change by the film handling apparatus and for momentarily causing said discharge control means to effect a discharge of said control capacitor to a low level below said predetermined level to thereby reset said system.

* * * * *